Sept. 11, 1928.
A. R. STEVENSON, JR
1,684,249
AUTOMATIC CIRCUIT CONTROLLER
Filed Feb. 9, 1925
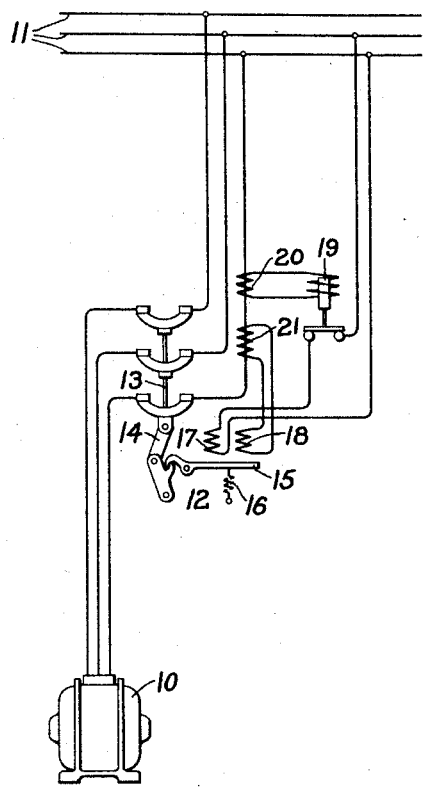
Inventor:
Alexander R. Stevenson, Jr.
by Alexander S. Lunt
His Attorney Patented Sept. 11, 1928.

1,684,249

UNITED STATES PATENT OFFICE.

ALEXANDER R. STEVENSON, JR., OF SCHENECTADY, NEW YORK, ASSIGNOR TO GENERAL ELECTRIC COMPANY, A CORPORATION OF NEW YORK.

AUTOMATIC CIRCUIT CONTROLLER.

Application filed February 9, 1925. Serial No. 7,801.

This invention relates to circuit controlling devices and more specifically to automatic circuit interrupters which operate responsively to predetermined electrical conditions in the controlled circuit, and the invention has for its object the provision of improved means for preventing the operation of such devices when the current in the controlled circuit exceeds the safe interrupting capacity of the device.

Although not necessarily limited thereto, the invention is of particular advantage when applied to automatic under-voltage circuit interrupters. Such devices usually are not designed to interrupt extremely heavy currents, particularly when the device is employed to afford voltage failure protection to an electric translating device, such as an electric motor or the like since under ordinary voltage failure conditions the current in the controlled circuit decreases to a practically negligible value. However, it may happen that an accidental short circuit or ground will reduce the voltage of the circuit below the value at which the under-voltage circuit interrupter is designed to operate. Under these conditions, the current in the controlled circuit may exceed the safe interrupting capacity of the interrupter to such an extent that upon the automatic operation of the device, destructive arcing at the contacts or even a dangerous explosion is likely to occur. Such a disastrous result is avoided in accordance with the present invention by preventing the operation of the interrupter when the current exceeds the interrupting capacity of the interrupter.

In carrying the invention into effect in a preferred form, the automatic circuit controller is provided with a holding winding which is connected to be energized responsively to the current in the circuit controlled by the controller and arranged to prevent operation of the controller when the current exceeds a predetermined value. In an automatic under-voltage circuit interrupter, the holding winding preferably is disposed in cooperating relation with the under-voltage trip mechanism of the interrupter and is designed to electromagnetically hold the trip mechanism from operating when the current in the controlled circuit is above the maximum safe value which the device can interrupt successfully. Thus, the holding winding effectively prevents the under-voltage circuit interrupter from operating under short circuit or heavy overload conditions when the operation thereof might be disastrous. However, when the under-voltage circuit interrupter is provided with an overload relay for controlling the under-voltage trip mechanism to permit the interrupter to protect against ordinary overload conditions, the holding winding is designed so as to be energized insufficiently to prevent the interruption of the circuit when the current is within the safe interrupting capacity of the device.

For a better understanding of my invention, reference is had to the following description taken in connection with the accompanying drawing in which the single figure diagrammatically illustrates an alternating current motor protective system employing an automatic circuit interrupter embodying the invention in order to explain the principles thereof. It will be understood however that the invention may be applied with equal advantage to a direct current automatic circuit interrupter if desired.

The novel features and combinations which I believe to be characteristic of my invention are pointed out with particularity in the appended claims.

Referring to the drawing, it will be seen that the connection of motor 10, which as shown is of the three phase alternating current type, to the three phase power supply lines 11 is under the control of the automatic circuit interrupter 12. The movable switch member 13 of interrupter 12 is provided with three circuit controlling contacts of the ordinary type as shown and is biased to the circuit opening position. A toggle mechanism 14 is provided for operating the movable switch member to the circuit closing position. The switch member 13 is arranged to be held in the circuit closing position in which it is shown by means of the pivoted latch 15 which cooperates with the toggle mechanism 14 as indicated in the drawing. Latch 15 is biased to the released position by suitable means such as the tension spring 16 shown and the latch is electromagnetically held in latching relation with the toggle mechanism 14 under the joint control of the under-voltage winding 17 and the holding winding 18. It will be observed that the winding 17 is connected to be energized responsively to the voltage of one phase of supply lines 11 under the control of the overload relay 19. Overload relay 19 is biased to the closed position in which it is shown and is connected to the current transformer 20 to be operatively energized to open its contact when the current supplied to motor 10 exceeds a predetermined overload value, such, for instance, as 150% or 200% normal load current. Thus the winding 17 cooperates with the latch mechanism of interrupter 12 to afford automatic under-voltage protection to motor 10 in the ordinary manner and also is controlled by relay 19 to afford overload protection to the motor.

In accordance with the present invention, the holding winding 18 is connected to be energized responsively to the current in the circuit controlled by the interrupter 12. This is accomplished, in the arrangement shown, through the agency of the current transformer 21. The transformer 21 is so designed that the winding 18 is not energized sufficiently to maintain the latch 15 in the latching position until the current through the interrupter 12 exceeds the safe interrupting capacity of the interrupter which may correspond to 10 or 20 times the normal load current of motor 10. Preferably the transformer 21 is of such high ratio that with the current in the motor circuit at or slightly above the overload value at which relay 19 operates, the winding 18 will not be operatively energized to any appreciable extent. This permits the operation of relay 19 to effect the release of the under-voltage trip mechanism and the consequent opening of the interrupter 12 under ordinary overload conditions of the motor 10. It will be evident, however, that by properly designing the holding winding 18 the same results may be obtained with the winding 18 energized from the ordinary overload current transformer 20.

While I have diagrammatically illustrated the under-voltage winding 17 and the holding winding 18, arranged to act separately upon the latch 15, it will be understood that these windings may be arranged upon a single magnetic core if desired although the arrangement illustrated is to be preferred.

With the several parts of the motor protective system arranged in the manner previously described, the operation is as follows: Since the circuit interrupter 12 is shown in the circuit closing position, the motor 10 may be assumed to be receiving current from the supply lines 11 under ordinary operating conditions. Under these conditions, the winding 17 is energized responsively to the voltage of one phase of the supply lines 11 and the resulting attractive effect upon the latch 15 serves to maintain the latch in latching relation with the toggle mechanism 14 against the bias of spring 16.

If the source from which the supply lines 11 are energized fails and the energizing voltage of winding 17 decreases below a certain value, it will be evident that the latch 15 will be released immediately to permit the interrupter 12 to open and protect the motor 10 from under-voltage conditions. Upon the return of normal voltage on the supply lines 11, the toggle mechanism 14 may be operated to close the interrupter 12 and reconnect the motor 10 to the supply lines. It will be understood that the latch 15 must be raised against the strain of biasing spring 16 into latching relation with the toggle mechanism 14 and the normal energization of winding 17 will maintain the latch 15 in the latching position.

If motor 10 is overloaded so as to produce a correspondingly increased flow of current from the supply lines 11 through the current transformer 20 such that the relay 19 is operatively energized, the relay immediately opens its contact to interrupt the energizing circuit of the under-voltage winding 17. If the overload current of motor 10 is within the safe interrupting capacity of interrupter 12, the winding 18 is not energized sufficiently to prevent the release of latch 15 when winding 17 is deenergized. Under these conditions, the latch 15 is released by the biasing spring 16 and permits the toggle mechanism 14 to collapse and thereby permit the switch member 13 of interrupter 12 to move to the open circuit position in accordance with its bias.

If a severe short circuit of the motor terminals or other abnormal overload condition should occur so that the resultant rush of current is of a greater value than the interrupter 12 can safely and successfully interrupt, my invention prevents operation of the interrupter in the following manner:— Although the current through the transformer 20 is sufficient to open the contacts of relay 19 and thereby deenergize the winding 17, as previously described, the slight time relay necessarily required to effect the operation of the latch 15 to the release position permits the holding winding 18 to become effective. With the extremely heavy current flow in the motor circuit resulting from the overload or short circuit condition assumed, the transformer 21 supplies sufficient energizing current to the winding 18 to independently maintain the latch 15 in the latching position and thus hold the interrupter 12 closed. In this way the interruption of the heavy overload or short circuit current by the interrupter 12 is effectively prevented so as to permit some suitable overload circuit breaker of ample current interrupting capacity remotely located in the supply lines 11 to respond and disconnect the heavily overloaded supply circuit.

In accordance with the provisions of the patent statutes I have described the principle of operation of my invention, together with the apparatus which I now consider to represent the best embodiment thereof, but I would have it understood that the apparatus shown is only illustrative, and that the invention may be carried out by other means.

What I claim as new and desire to secure by Letters Patent of the United States, is:

1. An automatic circuit interrupter comprising a movable switch member biased to the circuit opening position, electroresponsive means for holding the member in the circuit closing position, current responsive means arranged to be energized responsively to the current in the circuit controlled by the interrupter for effecting the release of said switch member responsively to predetermined current conditions in the controlled circuit, and electroresponsive means for independently maintaining the switch member in the circuit closing position when the current in the controlled circuit exceeds the safe interrupting capacity of the interrupter.

2. In an electroresponsive circuit controlling device, the combination of a movable circuit controlling member, means for moving the member responsively to a predetermined condition of the voltage of the circuit controlled by the device, means for moving the member responsively to a predetermined condition of the current of the controlled circuit, and means for preventing movement of the member by either of said first two means when the current in the controlled circuit exceeds a predetermined value.

3. An automatic circuit interrupter comprising a movable circuit controlling member, automatic means for operating the member to the circuit interrupting position responsively to a predetermined voltage condition of the circuit controlled by the interrupter, automatic means for operating the member to the circuit interrupting position responsively to a predetermined current condition of the circuit controlled by the interrupter, and electroresponsive means connected to be energized responsively to the current flowing in the controlled circuit for preventing the operation of the said circuit controlling member by either of said first two means when the current in the controlled circuit is above the safe interrupting capacity of the interrupter.

4. An automatic circuit interrupter comprising a movable switch member biased to the circuit interrupting position, electroresponsive holding means for holding the switch member in the circuit closing position when the voltage of the controlled circuit is above a predetermined value, current responsive means arranged to be energized responsively to the current in the circuit controlled by the interrupter for controlling the energization of said holding means to effect the release of the said switch member when the current in the controlled circuit is above a predetermined value, and electroresponsive means connected to be energized responsively to the current in the controlled circuit for maintaining the switch member in the circuit closing position upon operation of said first holding means to release the switch member when the current in the controlled circuit exceeds the safe interrupting capacity of the interrupter.

5. An automatic circuit interrupter comprising a movable switch member biased to the circuit interrupting position, electroresponsive latch mechanism normally connected to be energized responsively to the voltage of the circuit controlled by the interrupter for holding the said switch member in the circuit closing position, the said latch mechanism being biased to operate to release the said switch member when the energizing voltage thereof decreases below a predetermined value, an overload relay arranged to deenergize the said electroresponsive latch mechanism when the current in the circuit controlled by the interrupter exceeds a predetermined value to permit the said switch member to open in accordance with its bias, and a holding winding associated with said latch mechanism and connected to be energized responsively to the current in the controlled circuit for preventing the operation of said latch mechanism to release said switch member when the current in the controlled circuit exceeds the safe interrupting capacity of the breaker.

In witness whereof, I have hereunto set my hand this 7th day of February, 1925.

ALEXANDER R. STEVENSON, Jr.